(12) United States Patent
Huang et al.

(10) Patent No.: US 11,797,063 B2
(45) Date of Patent: Oct. 24, 2023

(54) PORTABLE ELECTRONIC DEVICE

(71) Applicant: SYNCMOLD ENTERPRISE CORP., New Taipei (TW)

(72) Inventors: Chun-Hao Huang, New Taipei (TW); Ching-Hui Yen, New Taipei (TW); Chien-Cheng Yeh, New Taipei (TW)

(73) Assignee: SYNCMOLD ENTERPRISE CORP., New Taipei (TW)

( * ) Notice: Subject to any disclaimer, the term of this patent is extended or adjusted under 35 U.S.C. 154(b) by 0 days.

(21) Appl. No.: 17/697,838

(22) Filed: Mar. 17, 2022

(65) Prior Publication Data

US 2022/0308641 A1    Sep. 29, 2022

Related U.S. Application Data

(60) Provisional application No. 63/167,235, filed on Mar. 29, 2021.

(30) Foreign Application Priority Data

Dec. 15, 2021   (TW) .................................. 110214958

(51) Int. Cl.
*G06F 1/16*      (2006.01)
(52) U.S. Cl.
CPC .......... *G06F 1/1681* (2013.01); *G06F 1/1616* (2013.01); *G06F 1/1652* (2013.01)

(58) Field of Classification Search
CPC ..... G06F 1/1681; G06F 1/1616; G06F 1/1652
See application file for complete search history.

(56) References Cited

U.S. PATENT DOCUMENTS

| | | | |
|---|---|---|---|
| 7,196,692 B2 * | 3/2007 | Mochizuki ............ | G06F 1/1601 345/905 |
| 9,201,466 B2 * | 12/2015 | Lai ........................ | G06F 1/1681 |
| 9,507,388 B1 * | 11/2016 | Hampton .............. | G06F 1/1637 |
| 9,874,906 B1 * | 1/2018 | Hsu ....................... | G06F 1/1681 |
| 10,761,574 B1 * | 9/2020 | Hsu ....................... | G06F 1/1626 |
| 10,976,779 B1 * | 4/2021 | Tsai ...................... | G06F 1/1615 |
| 11,237,589 B2 * | 2/2022 | Jan ....................... | H05K 5/0017 |
| 11,442,506 B1 * | 9/2022 | Hsu ....................... | G06F 1/1654 |
| 11,543,858 B2 * | 1/2023 | Chen .................... | G06F 1/1624 |
| 2019/0112852 A1 * | 4/2019 | Hsu ....................... | G06F 1/1618 |
| 2020/0379507 A1 * | 12/2020 | Jan ....................... | G06F 1/1681 |
| 2022/0151092 A1 * | 5/2022 | Cho ...................... | G09F 9/30 |

\* cited by examiner

*Primary Examiner* — Rockshana D Chowdhury
(74) *Attorney, Agent, or Firm* — Muncy, Geissler, Olds & Lowe, P.C.

(57) ABSTRACT

A portable electronic device is provided. The portable electronic device comprises a main body, a flexible display, two pivoting modules and a central shaft. The flexible display is pivotably disposed on the main body. The pivoting modules are connected between the flexible display and the main body for pivotally connecting the flexible display to the main body. The central shaft penetrates through the pivoting modules along an axis. The flexible display gradually bends inward to form a curved surface along with the flexible display pivoting from a close status to an open status with respect to the main body about the axis.

14 Claims, 12 Drawing Sheets

PORTABLE ELECTRONIC DEVICE

CROSS REFERENCE TO RELATED APPLICATION

This application claims the benefit of U.S. Provisional Application Ser. No. 63/167,235 filed on Mar. 29, 2021, and the benefit of Taiwan Patent Application Serial No. 110214958 filed on Dec. 15, 2021. The entirety of each Application is incorporated herein by reference.

BACKGROUND OF THE INVENTION

1. Field of the Invention

The present invention relates to a portable electronic device, more particularly, to a portable electronic device having the display pivoting and bending simultaneously.

2. Description of Related Art

With the development of display technology and curved screens having advantages of fitting to the user's field of vision, more and more related products have been published in recent years. The curved screens on the current market are primarily used in large-sized rigid monitors. It is less applicable for small-sized portable electronic devices since the rigid curved display occupies more space. On the other hand, portable electronic devices with flexible displays are still not popular at present.

SUMMARY OF THE INVENTION

The objective of the present invention is to provide a portable electronic device with a flexible display. When the portable electronic device is not in service with the lid closed, the display presents flat for the convenience of carrying and storage. When the portable electronic device is in service with the lid opened, the display will be bent into a predetermined curvature along with the display pivoting with respect to the main body of the device. In this way, a more comfortable viewing angle is provided, and at the same time, the screen has a greater sense of depth, allowing users to have a more immersive user experience.

To achieve the aforesaid objective, the portable electronic device of the present invention comprises a main body, a flexible display, two pivoting modules and a central shaft. The flexible display is pivotably disposed on the main body. The pivoting modules are connected between the flexible display and the main body for pivotally connecting the flexible display to the main body. The central shaft penetrates through the pivoting modules along an axis. The flexible display gradually bends inward to form a curved surface along with the flexible display pivoting from a close status to an open status with respect to the main body about the axis.

Each of the pivoting modules comprises a seat, an outer cam, an inner cam, an elastic element and a supporting element. The seat is fixed to the main body. The outer cam is fixed to the seat and sleeved on the central shaft. The inner cam is sleeved on the central shaft for being able to rotate about the axis and slidably move along the axis, wherein the inner cam has an extending shaft perpendicular to the axis. The elastic element abuts against the inner cam and the seat therebetween to apply an elastic force to the inner cam towards the outer cam. The supporting element connects to the flexible display, wherein the supporting element is sleeved on the extending shaft and is able to rotate with respect to the extending shaft.

Each of the outer cams has at least one concave part, and each of the inner cams has at least one convex part. The at least one concave part and the at least one convex part are complementarily engaged with each other when the flexible display is in the close status.

Each of the outer cams has plural concave parts, which are peripherally and symmetrically arranged, and each of the inner cams has plural convex parts, which are peripherally and symmetrically arranged.

When the flexible display pivots from the close status to the open status, the inner cams rotate with respect to the outer cams and the convex parts interfere with the concave parts so that the inner cams approach each other along the central shaft against the elastic force.

Each of the concave parts has a first incline, and each of the convex parts has a second incline. The second inclines correspondingly slide on the first inclines respectively when the convex parts of the inner cams and the concave parts of the outer cams correspondingly and relatively move with each other with interference.

Each of the first inclines and the second inclines peripherally extends in 90 degrees about the axis.

The flexible display is deflected in maximum when the flexible display is pivoted with respect to the main body by 90 degrees. The flexible display remains in deflection in maximum when the flexible display is pivoted with respect to the main body over 90 degrees.

Each of the outer cams has plural flat sections being formed between the concave parts respectively. The convex parts detach from the concave parts and abut against the flat parts respectively when the flexible display is in the open status.

Each of the outer cams has a first hole being a circular hole, and each of the inner cams has a second hole being a non-circular hole. The central shaft has two penetrating sections, which are symmetrically disposed and have non-circular cross-sections corresponding to the second holes.

The central shaft penetrates the inner cams so that the inner cams and the central shaft rotate simultaneously.

Each of the inner cams further has two stopping blocks. When the flexible display is in the close status or rotates to an extreme position, one of the two stopping blocks abuts against the seat.

Each of the supporting elements has a bearing section fixed to the flexible display and a bending section sleeved on the extending shaft.

Each of the supporting elements further has a shaft hole, and the shaft holes are formed on the bending sections for the extending shafts penetrating therethrough, respectively.

The shaft holes are non-circular. When the flexible display is in the close status, the extending shafts are in an engaging position. When the flexible display pivots from the close status, the supporting elements rotate with respect to the extending shafts correspondingly in which one of the supporting elements rotates clockwise and the other one of the supporting elements rotates counterclockwise.

The detailed technology and preferred embodiments implemented for the present invention are described in the following paragraphs accompanying the appended drawings for people skilled in this field to well appreciate the features of the claimed invention.

DETAILED DESCRIPTION OF THE PREFERRED EMBODIMENT

Figure 1:
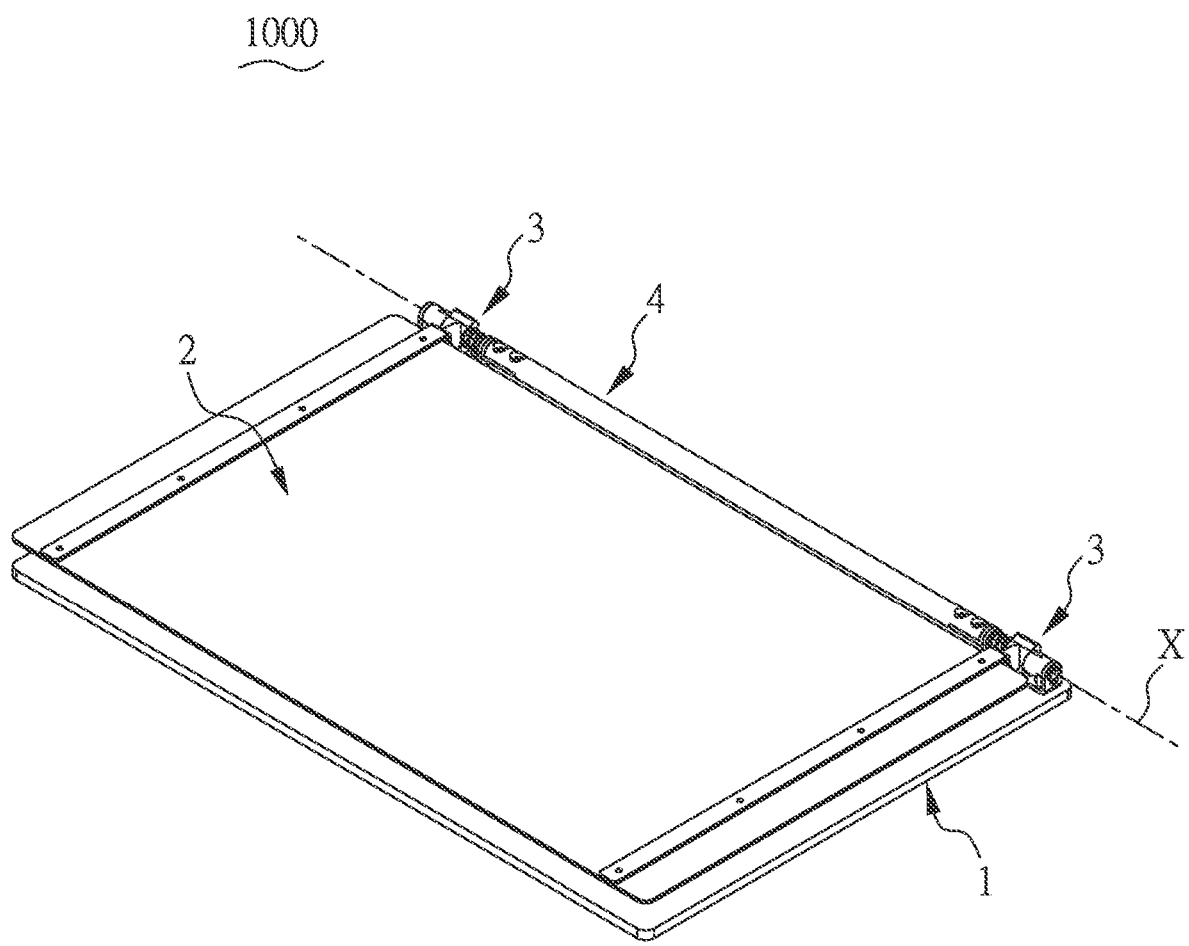
FIG. 1 is a perspective view of the portable electronic device of the present invention showing the flexible display in the close status.
Figure 2:
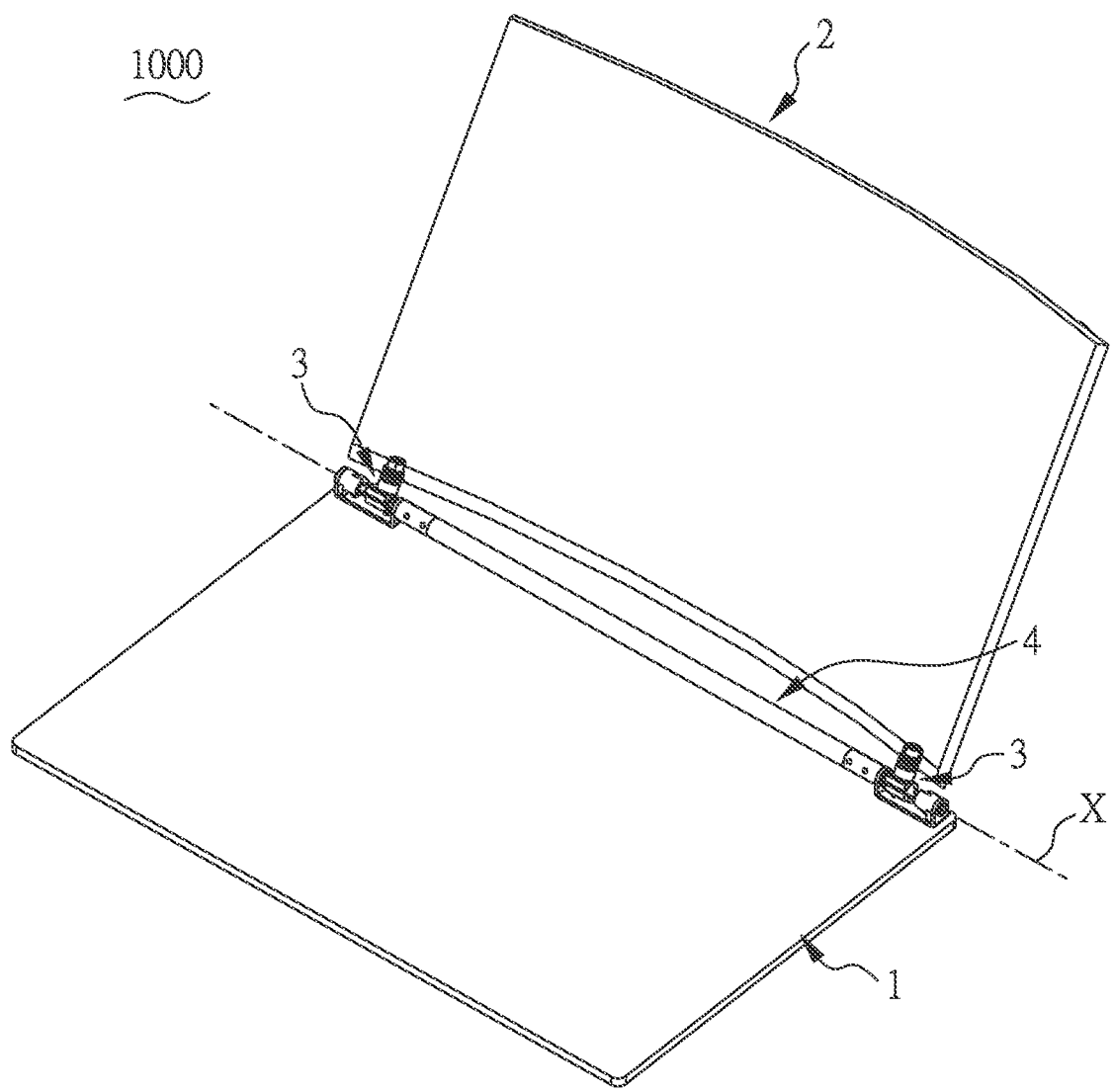
FIG. 2 is a perspective view of the portable electronic device of the present invention showing the flexible display in the open status.
Figure 3:
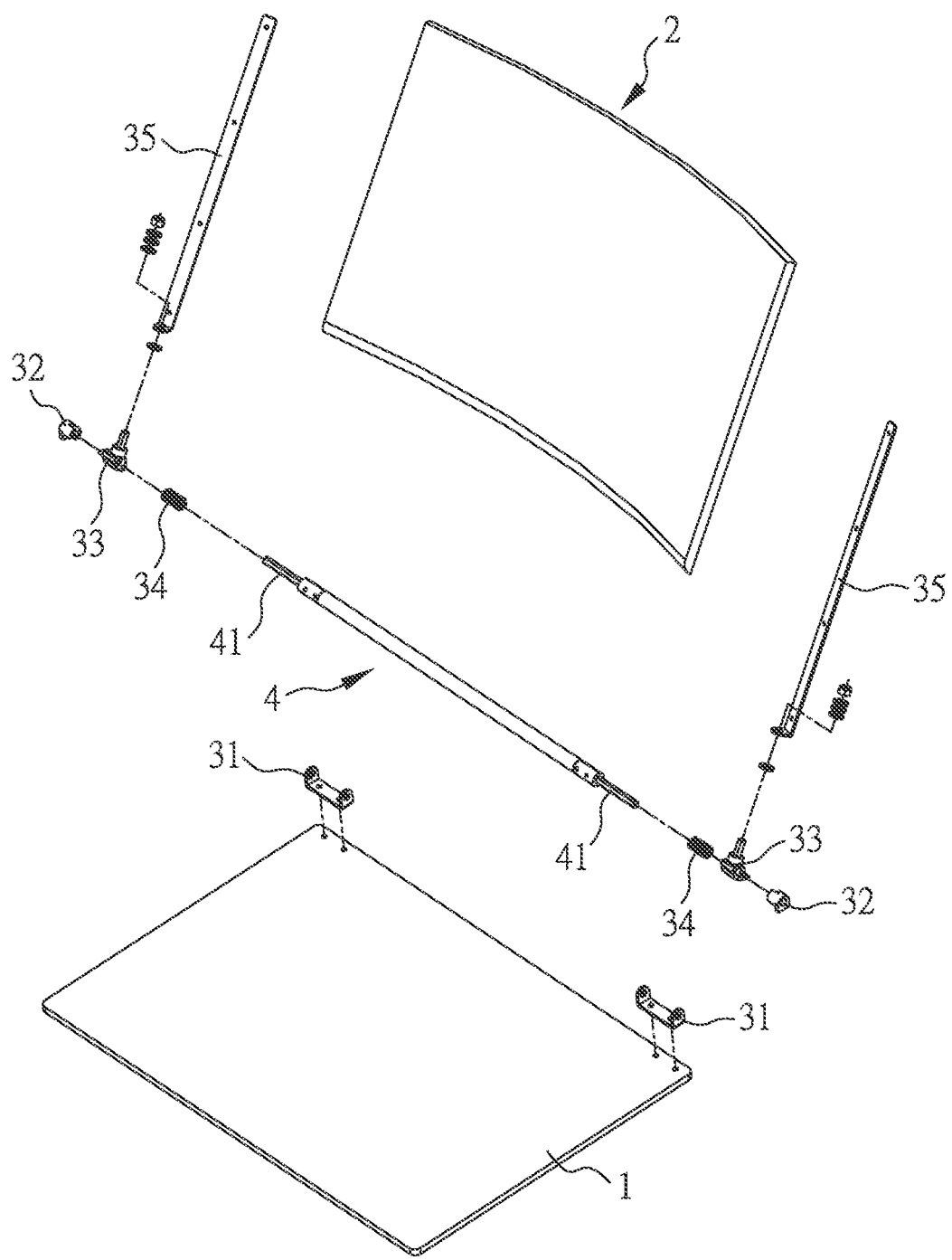
FIG. 3 is an exploded view of the portable electronic device of the present invention.

With reference to FIG. 1 to FIG. 3, the portable electronic device 1000 of the present invention is shown. The portable electronic device 1000 comprises a main body 1, a flexible display 2, two pivoting modules 3 and a central shaft 4. In the present embodiment, the portable electronic device 1000 is a laptop, including the base as the main body 1 and the lid as the flexible display 2. The central shaft 4 defines an axis X. The flexible display 2 is pivotable about the axis X with respect to the main body 1. The flexible display 2 gradually bends inward to form a curved surface when it pivoting from a close status to an open status with respect to the main body 1 about the axis X.

Please further refer to FIG. 4 to FIG. 10. The pivoting modules 3 are connected between the flexible display 2 and the main body 1 individually at two opposite sides for the flexible display 2 pivotally connecting to the main body 1. Each of the pivoting modules 3 includes a seat 31, an outer cam 32, an inner cam 33, an elastic element 34, and a supporting element 35. The seats 31 are fixed to the main body 1 for the central shaft 4 penetrating therethrough. The outer cams 32 are fixed to the seats 31 and sleeved on the central shaft 4. Each of the outer cams 32 has at least one concave part 321, plural flat sections 322 and a first hole 323. In the present embodiment, each of the outer cams 32 has two concave parts 321, each of the concave parts 321 has a first incline 3211, and each of the first inclines 3211 peripherally extends in 90 degrees about the axis X. The flat sections 322 are formed between the concave parts 321 respectively. That is to say, the concave parts 321 and the flat sections 322 are annularly and alternately arranged. Each of the first holes 323 is a circular hole so that the central shaft 4 is rotatable with respect to the outer cams 32.

The inner cams 33 are sleeved on the central shaft 4 for being able to rotate about the axis X and slidably move along the axis X. Each of the inner cams 33 has at least one convex part 331, an extending shaft 332, a second hole 333 and two stopping block 334. In the present embodiment, each of the inner cams 33 has two convex parts 331, each of the convex parts 331 has a second incline 3311, and each of the second inclines 3311 peripherally extends in 90 degrees about the axis X. The convex parts 331 correspond to the concave parts 321, and the second inclines 3311 and the first inclines 3211 are formed for contacting with each other. Each of the second holes 333 is a non-circular hole, which is engaged with the central shaft 4, and hence the inner cams 33 and the central shaft 4 rotate simultaneously. At the same time, the extending shafts 332 rotate about the axis X and remain to be perpendicular to the axis X.

Figure 7:
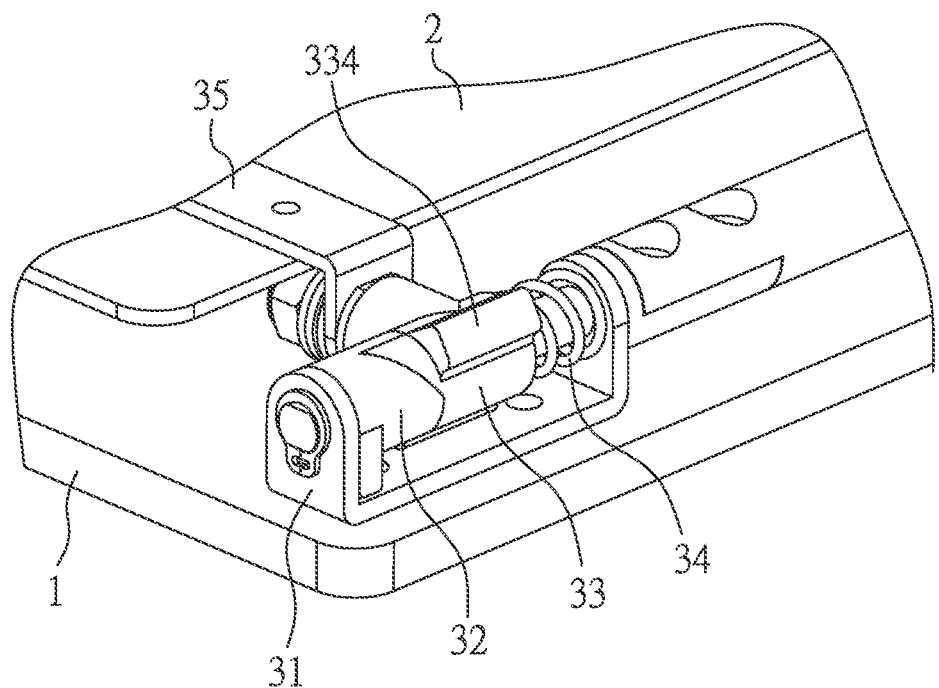
FIG. 7 is a partial perspective view of the portable electronic device of the present invention showing the flexible display in the close status.
Figure 8:
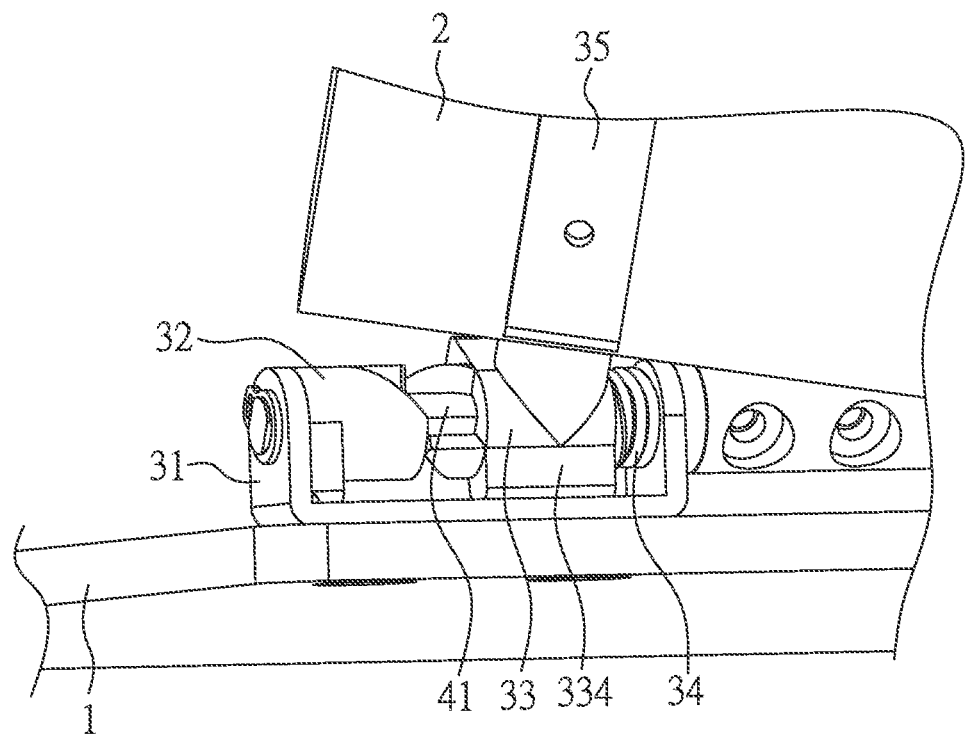
FIG. 8 is a partial perspective view of the portable electronic device of the present invention showing the flexible display in the open status.
Figure 9:
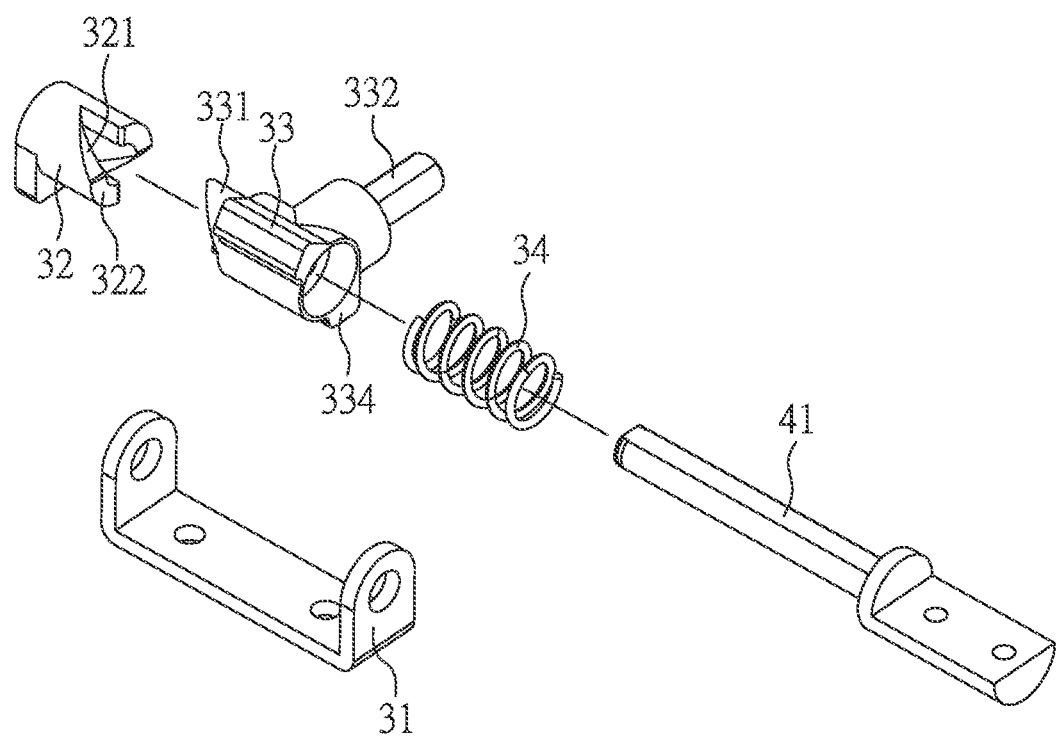
FIG. 9 is a partial exploded view of the portable electronic device of the present invention showing the flexible display in the close status.
Figure 10:
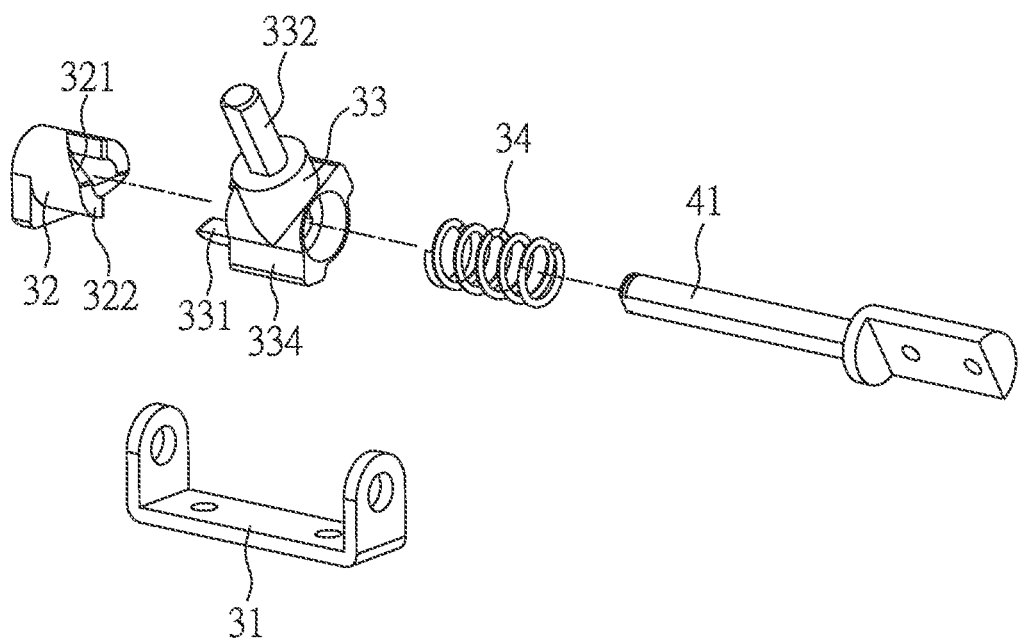
FIG. 10 is a partial exploded view of the portable electronic device of the present invention showing the flexible display in the open status.

It should be noted that, as shown in FIG. 7, when the flexible display 2 is in the close status, the outer cams 32 and the inner cams 33 engage with each other. Therefore, the concave parts 321 of the outer cams 32 and the convex parts 331 of the inner cams 33 are matched, and the quantities are the same. More specifically, each of the outer cams 32 has plural concave parts 321, which are peripherally and symmetrically arranged, and each of the inner cams 33 has plural convex parts 331, which are peripherally and symmetrically arranged. In this embodiment, each of the outer cams 32 has two concave parts 321 and each of the inner cams 33 has two convex parts 331 for illustration. In other embodiments, the numbers of the concave parts 321 and the convex parts 331 can be adjusted.

The elastic element 34 abuts against the inner cam 33 and the seat 31 therebetween and is compressed to apply an elastic force to the inner cams 33 towards the outer cams 32. When the flexible display 2 presents at certain positions between the close status and the open status, the elastic force tends to pivot the flexible display 2 to the close status.

Figure 4:
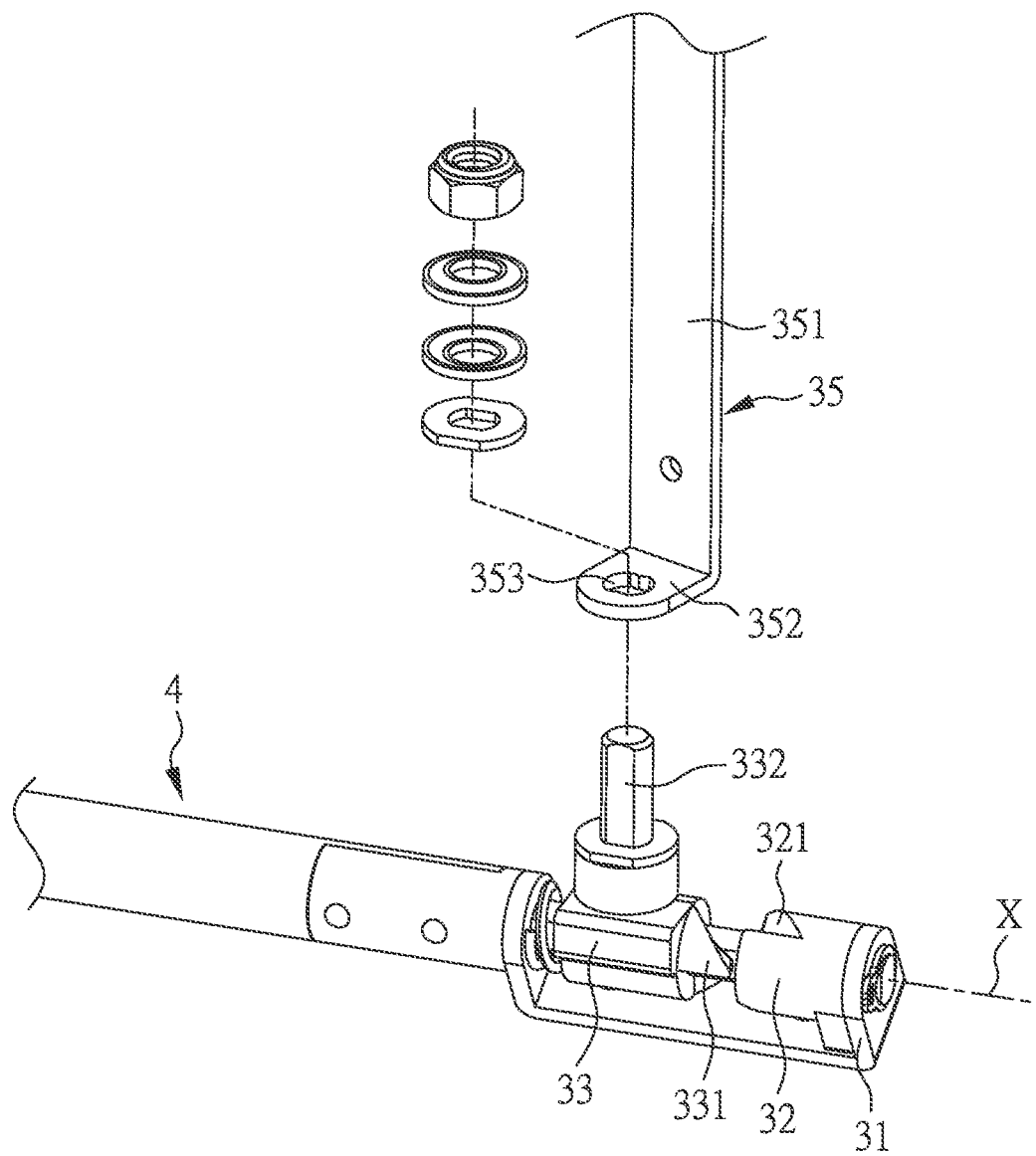
FIG. 4 is a partial exploded view of the portable electronic device of the present invention.
Figure 5:
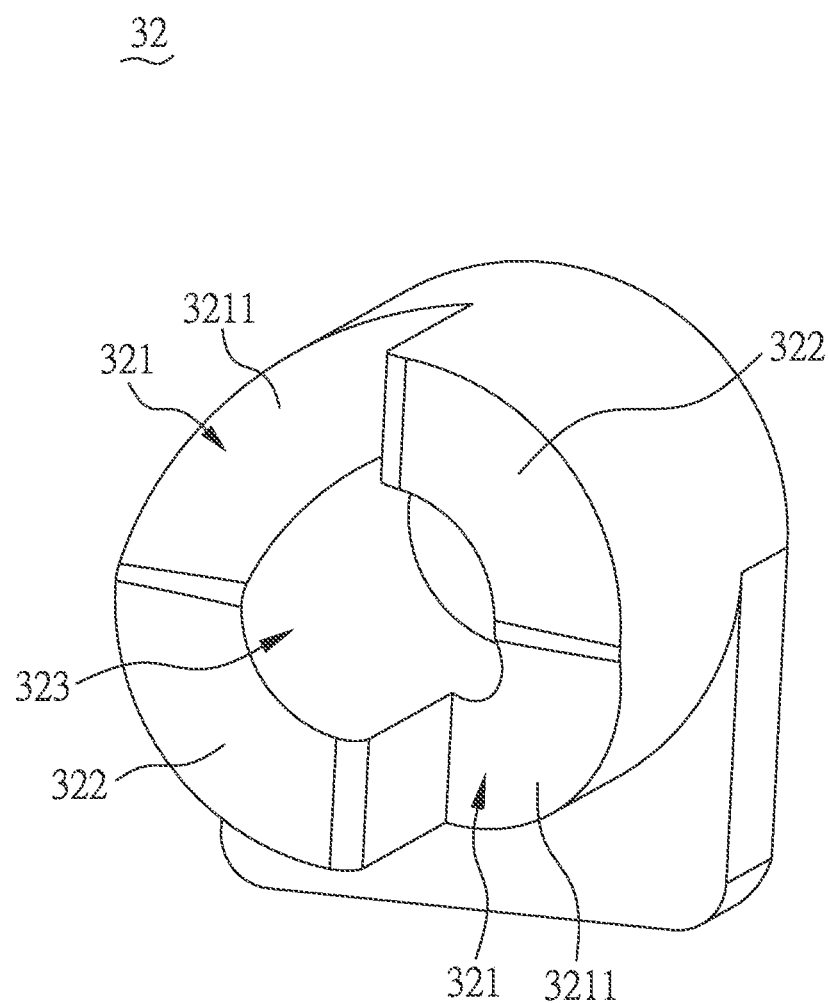
FIG. 5 is a perspective view of the outer cam of the portable electronic device of the present invention.
Figure 6:
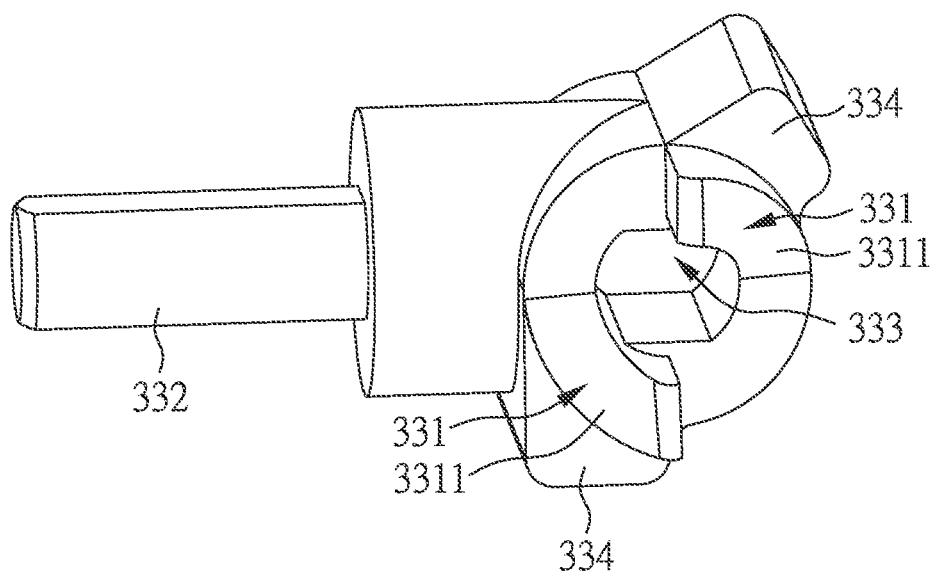
FIG. 6 is a perspective view of the inner cam of the portable electronic device of the present invention.
Figure 11:
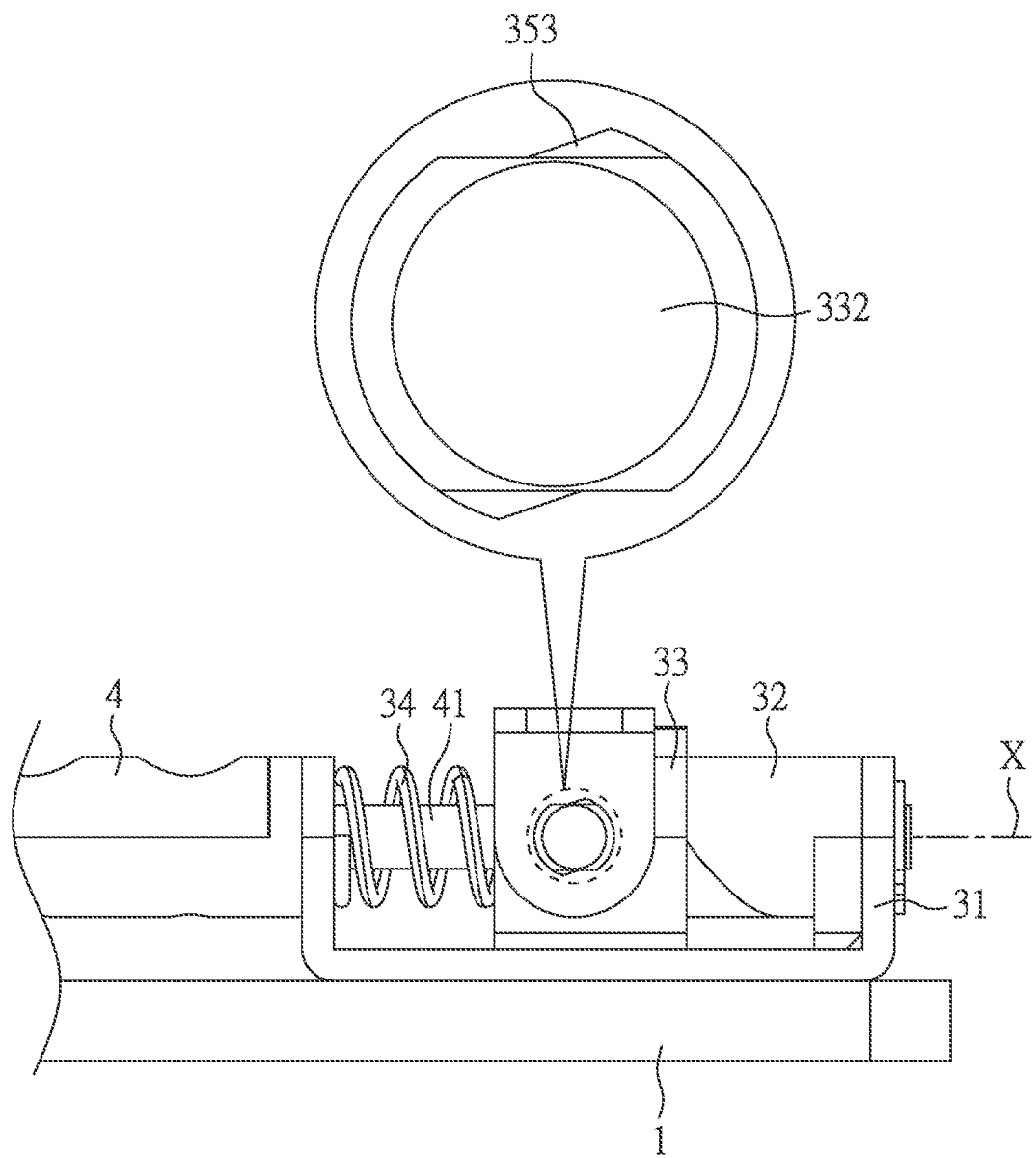
FIG. 11 is a partial schematic view of the portable electronic device of the present invention showing the flexible display in the close status.
Figure 12:
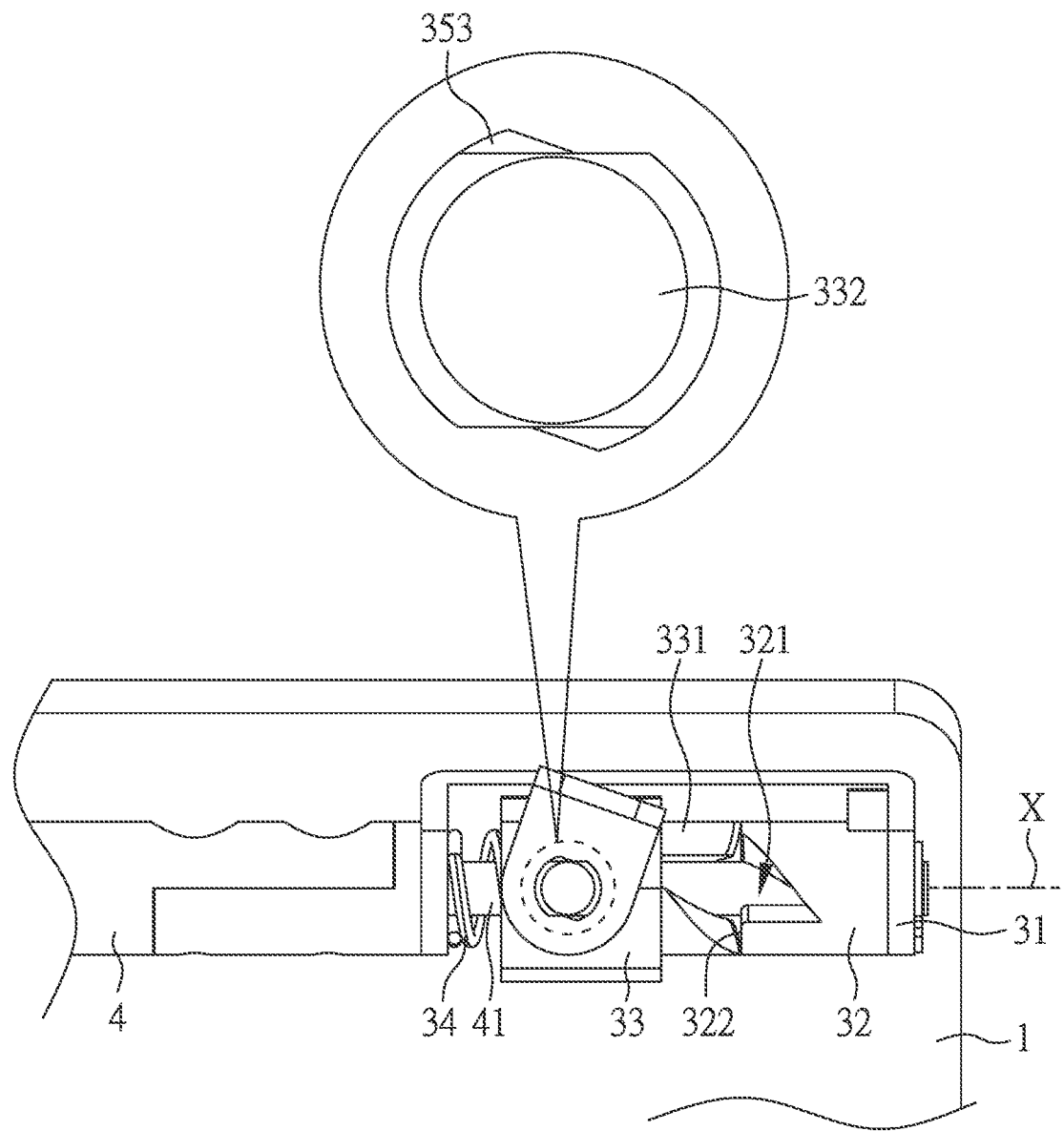
FIG. 12 is a partial schematic view of the portable electronic device of the present invention showing the flexible display in the open status.

Please refer to FIG. 4, FIG. 11 and FIG. 12. The supporting element 35 connects to the flexible display 2, is sleeved on the extending shaft 332, and is able to rotate with respect to the extending shaft 332. Each of the supporting elements 35 has a bearing section 351, a bending section 352 and a shaft hole 353. The bearing section 351 is fixed to the flexible display 2, and the bending section 352 is sleeved on the extending shaft 332. The shaft hole 353 is formed on the bending section 352 for the extending shaft 332 penetrating therethrough.

The central shaft 4 penetrates through the pivoting modules 3 along the axis X. The central shaft 4 has two penetrating sections 41, which are symmetrically disposed and have non-circular cross-sections corresponding to the second holes 333. The penetrating section 41 penetrates through the second hole 333, and therefore the inner cams 33 are able to rotate along with the penetrating section 41. Besides, the central shaft 4 penetrates through both the two inner cams 33 so that the inner cams 33 and the central shaft 4 can be rotated simultaneously. In combination with supporting elements 35, the flexible display 2 can be evenly bent.

The operation of the portable electronic device 1000 of the present invention is illustrated in the following paragraphs. As shown in FIG. 1, FIG. 7, FIG. 9 and FIG. 11, the concave parts 321 and the convex parts 331 are complementarily engaged with each other when the flexible display 2 is in the close status. During the process of the flexible display 2 pivoting from the close status to the open status, the inner cams 33 are driven by an external force to rotate with respect to the outer cams 32, and the convex parts 331 interfere with the concave parts 321 so that the inner cams 33 approach each other along the central shaft 4 against the elastic force. In detail, the second inclines 3311 correspondingly slide on the first inclines 3211 respectively when the convex parts 331 of the inner cams 33 relatively move with respect to the concave parts 321 of the outer cams 32 with interference. If the external force is removed at this time, the elastic force will push the inner cams 33 toward the corresponding outer cams 32 so that the flexible display 2 returns to the close status.

As the flexible display 2 gradually pivots from the close status to the open status with respect to the main body 1, the inner cams 33 approach each other and the distance therebetween becomes shorter. At this time, the flexible display 2 gradually increases in the degree of deflection from a plane. The flexible display 2 is deflected in maximum when the flexible display 2 is pivoted with respect to the main body 1 by 90 degrees. When the flexible display 2 pivots with respect to the main body 1 over 90 degrees, as shown in FIG. 2, FIG. 8, FIG. 10 and FIG. 12, the convex parts 331 detach from the concave parts 321 and abut against the flat parts 322 respectively. Therefore, the deflection of the flexible display 2 will be unchanged (the flexible display 2 remains in maximum deflection). The angle of rotation required for the flexible display 2 to be pivoted to the open status is determined by the extension angles of the first inclines 3211 and the second inclines 3311. In the present embodiment, since each of the first inclines 3211 of the concave parts 321 and the second inclines 3311 of the convex parts 331 peripherally extends in 90 degrees about the axis X, the flexible display 2 is deflected in maximum when the flexible display 2 is pivoted with respect to the main body 1 by 90 degrees. However, the extension angles of the first inclines 3211 and the second inclines 3311 can be modified in other embodiments.

Moreover, referring to FIG. 6 to FIG. 10, when the flexible display 2 is in the close status or rotates to an extreme position, one of the stopping blocks 334 of each of the inner cams 33 abuts against the seat 31. Thereby, the range of the flexible display 2 rotating with respect to the main body 1 is limited. More specifically, the stopping blocks 334 contact with the seat 31 when the flexible display 2 is located at the extreme position in the open status. At this time, the inner cams will be limited and no longer rotate further when the flexible display 2 at the extreme position. In detail, if the numbers of the concave parts 321 and the convex parts 331 are plurals, the blocking effect is particularly required when the flexible display 2 is located at the extreme position. Since the concave parts 321 are peripherally and symmetrically arranged, if the flexible display 2 rotates beyond a certain angle without any block of the pivoting modules 3, the convex part 331 will engage with another concave part 321. In this case, the flexible display 2 will no longer rotate in the reverse direction, and therefore cannot return to the close status. Hence, the stopping blocks 334 are configured to set the extreme position of the flexible display 2 to avoid misoperation.

In addition, it should be noted that the rotation of the supporting element 35 with respect to the extending shaft 332 is limited. As shown in FIG. 4, FIG. 11 and FIG. 12, the extending shafts 332 are flat shafts, and the shaft holes 353 are non-circular holes so that the supporting elements 35 are allowed to rotate slightly with respect to the extending shafts 332. When the flexible display 2 is in the close status (as shown in FIG. 11), the extending shafts 332 are located at an engaging position where two plane surfaces of the shaft holes 353 abut against the extending shafts 332. When the flexible display 2 pivots from the close status, the inner cams 33 approach each other making the flexible display 2 bend. The supporting elements 35 rotate with respect to the extending shafts 332 correspondingly in which one of the supporting elements 35 (the supporting element 35 on the right as shown in FIGS. 1 and 2) rotates clockwise (from FIG. 11 to FIG. 12), and the other one of the supporting elements (the supporting element 35 on the left as shown in FIGS. 1 and 2) rotates counterclockwise. When the flexible display 2 is pivoted to the open status, the other two plane surfaces of the shaft holes 353 abut against the extending shafts 332 (as shown in FIG. 12). Thereby, the rotation directions of the two supporting elements 35 are opposite as the inner cams 33 approach each other and the distance between the inner cams 33 is shortened, to ensure the flexible display 2 bending with expected concave in front of the user.

In summary, the portable electronic device of the present invention is characterized by the pivoting modules located between the main body and the flexible display. The pivoting modules have two cams, and the interference between the two cams brings the lateral compression to the flexible display. Therefore, the flexible display can gradually pivot with respect to the main body and bend simultaneously. When the flexible display is pivoted to an angle for operation, the flexible display presents with a predetermined curvature simultaneously.

Although the present invention has been explained in relation to its preferred embodiment, it is to be understood that many other possible modifications and variations can be made without departing from the spirit and scope of the invention as hereinafter claimed.

What is claimed is:
1. A portable electronic device, comprising:
a main body;
a flexible display being pivotably disposed on the main body;
two pivoting modules being connected between the flexible display and the main body for pivotally connecting the flexible display to the main body, and each of the pivoting modules comprising:
a seat fixed to the main body;
an outer cam fixed to the seat;
an inner cam;
an elastic element abutting against the inner cam and the seat therebetween to apply an elastic force to the inner cam towards the outer cam; and
a supporting element connecting to the flexible display,
a central shaft penetrating through the pivoting modules along an axis;
wherein the flexible display gradually bends inward to form a curved surface along with the flexible display pivoting from a close status to an open status with respect to the main body about the axis
wherein the outer cam is sleeved on the central shaft;
wherein the inner cam is sleeved on the central shaft for being able to rotate about the axis and slidably move along the axis, and has an extending shaft perpendicular to the axis; and
wherein the supporting element is sleeved on the extending shaft and is able to rotate with respect to the extending shaft.
2. The portable electronic device as claimed in claim 1, wherein each of the outer cams has at least one concave part, each of the inner cams has at least one convex part, and the at least one concave part and the at least one convex part are complementarily engaged with each other when the flexible display is in the close status.

3. The portable electronic device as claimed in claim 2, wherein each of the outer cams has plural concave parts, which are peripherally and symmetrically arranged, and each of the inner cams has plural convex parts, which are peripherally and symmetrically arranged.

4. The portable electronic device as claimed in claim 3, wherein when the flexible display pivots from the close status to the open status, the inner cams rotate with respect to the outer cams and the convex parts interfere with the concave parts so that the inner cams approach each other along the central shaft against the elastic force.

5. The portable electronic device as claimed in claim 4, wherein each of the concave parts has a first incline, each of the convex parts has a second incline, and wherein the second inclines correspondingly slide on the first inclines respectively when the convex parts of the inner cams and the concave parts of the outer cams correspondingly and relatively move with each other with interference.

6. The portable electronic device as claimed in claim 5, wherein each of the first inclines and the second inclines peripherally extends in 90 degrees about the axis.

7. The portable electronic device as claimed in claim 6, wherein the flexible display is deflected in maximum when the flexible display is pivoted with respect to the main body by 90 degrees, and the flexible display remains in deflection in maximum when the flexible display is pivoted with respect to the main body over 90 degrees.

8. The portable electronic device as claimed in claim 7, wherein each of the outer cams has plural flat sections being formed between the concave parts respectively, and the convex parts detach from the concave parts and abut against the flat parts respectively when the flexible display is in the open status.

9. The portable electronic device as claimed in claim 8, wherein each of the outer cams has a first hole being a circular hole, each of the inner cams has a second hole being a non-circular hole, and the central shaft has two penetrating sections, which are symmetrically disposed and have non-circular cross-sections corresponding to the second holes.

10. The portable electronic device as claimed in claim 9, wherein the central shaft penetrates the inner cams so that the inner cams and the central shaft rotate simultaneously.

11. The portable electronic device as claimed in claim 10, wherein each of the inner cams further has two stopping blocks, and when the flexible display is in the close status or rotates to an extreme position, one of the two stopping blocks abuts against the seat.

12. The portable electronic device as claimed in claim 1, wherein each of the supporting elements has a bearing section fixed to the flexible display and a bending section sleeved on the extending shaft.

13. The portable electronic device as claimed in claim 12, wherein each of the supporting elements further has a shaft hole, and the shaft holes are formed on the bending sections for the extending shafts penetrating therethrough, respectively.

14. The portable electronic device as claimed in claim 13, wherein the shaft holes are non-circular, and wherein when the flexible display is in the close status, the extending shafts are in an engaging position, and when the flexible display pivots from the close status, the supporting elements rotate with respect to the extending shafts correspondingly in which one of the supporting elements rotates clockwise and the other one of the supporting elements rotates counterclockwise.

* * * * *